United States Patent [19]
Lee

[11] Patent Number: 6,042,083
[45] Date of Patent: Mar. 28, 2000

[54] BUTTERFLY VALVE

[75] Inventor: Hee-Soon Lee, 101-509 Kang Byun Shin Ik Apt., 408, Shinpyung2-dong, Sah-gu, Pusan, Rep. of Korea

[73] Assignee: Hee-Soon Lee, Pusan, Rep. of Korea

[21] Appl. No.: 08/937,936

[22] Filed: Sep. 25, 1997

[30] Foreign Application Priority Data

Sep. 25, 1996 [KR] Rep. of Korea ................ 96-32420
Sep. 25, 1996 [KR] Rep. of Korea ................ 96-43405

[51] Int. Cl.[7] .................................................. F16K 1/24
[52] U.S. Cl. ...................................... 251/161; 251/162
[58] Field of Search .............................. 251/161, 162, 251/163

[56] References Cited

U.S. PATENT DOCUMENTS

| | | | |
|---|---|---|---|
| 2,919,885 | 1/1960 | Daigle | 251/161 |
| 3,141,648 | 7/1964 | White | 251/163 |
| 4,013,264 | 3/1977 | Friedell | 251/162 X |

*Primary Examiner*—John Fox
*Attorney, Agent, or Firm*—Knobbe, Martens, Olson & Bear, LLP

[57] ABSTRACT

A butterfly valve is disclosed, wherein a pair of rotating shafts for rotating a disk. One of the shafts is used to rotate the disk by 90 degree, the other is used to linearly displace the disk, thereby tightly depressing the disk on the valve seat to completely prevent the leak.

2 Claims, 7 Drawing Sheets

BUTTERFLY VALVE

BACKGROUND OF THE INVENTION (1) Field of the Invention

The present invention relates to a butterfly valve which can maintain water-tightness by tightly depressing a disk on a valve seat in accordance with an operation of a cam.

(2) Description of Related Art

A conventional butterfly valve comprises a cylindrical body, a metallic valve seat fixed on an inner circumferential of the body, a disk rotating about a rotating shaft to open and close a conduit, and a seat-ring mounted around the disk.

However, in the conventional butterfly valve, since the leak is prevented by contacting force of the disk on the valve seat, if the seat is worn by repeated opening and closing operations, the leak occurs. In addition, since the disk is supported by only the rotating shaft, it is subject to a severe shock by reversed water pressure, deteriorating the water-tightness. Particularly, the valve having a valve seat made of rubber material cannot be used with corrosive liquids because of the valve seat degradation. A metallic valve seat is not easy in its manufacture because a high preciseness is required to make the metallic valve seat.

To solve the above described problems, a valve using hydraulic cylinders which push the disk toward the valve seat has been proposed. However, this makes the structure of the valve complicated because additional components for operating the hydraulic cylinders are required, resulting of a high cost in manufacture.

SUMMARY OF THE INVENTION

Therefore, the present invention has been made in an effort to solve the above described problems of the conventional art.

It is an object of the present invention to provide a butterfly valve which can maintain water-tightness by tightly depressing a disk on a valve seat with high reliability.

To achieve the above object, the present invention provides a pair of rotating shafts for rotating a disk. One of the shafts is used to rotate the disk by 90 degrees, the other is used to linearly displace the disk, thereby tightly depressing the disk on the valve seat to completely prevent the leak.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENT

Figure 1:
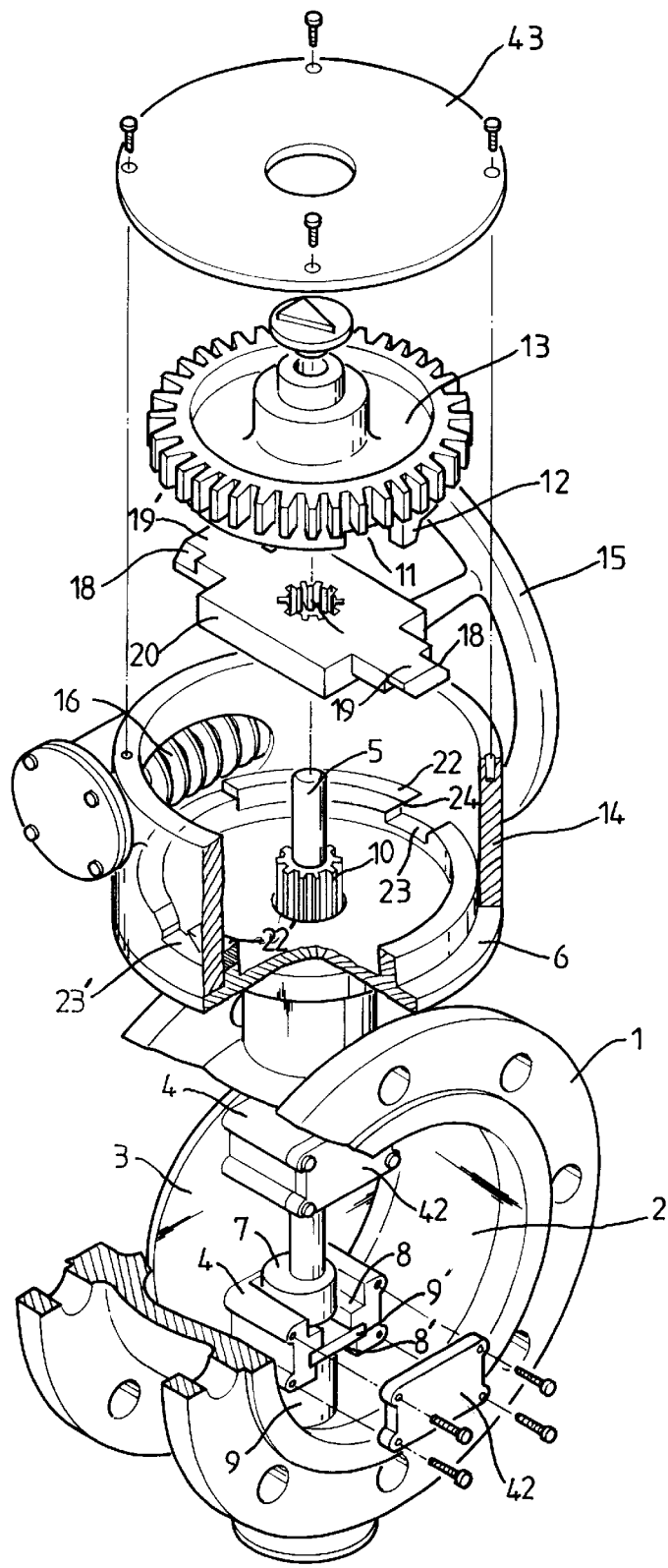
FIG. 1 is a partially broken exploded perspective view illustrating a valve according to a preferred embodiment of the present invention.
Figure 2:
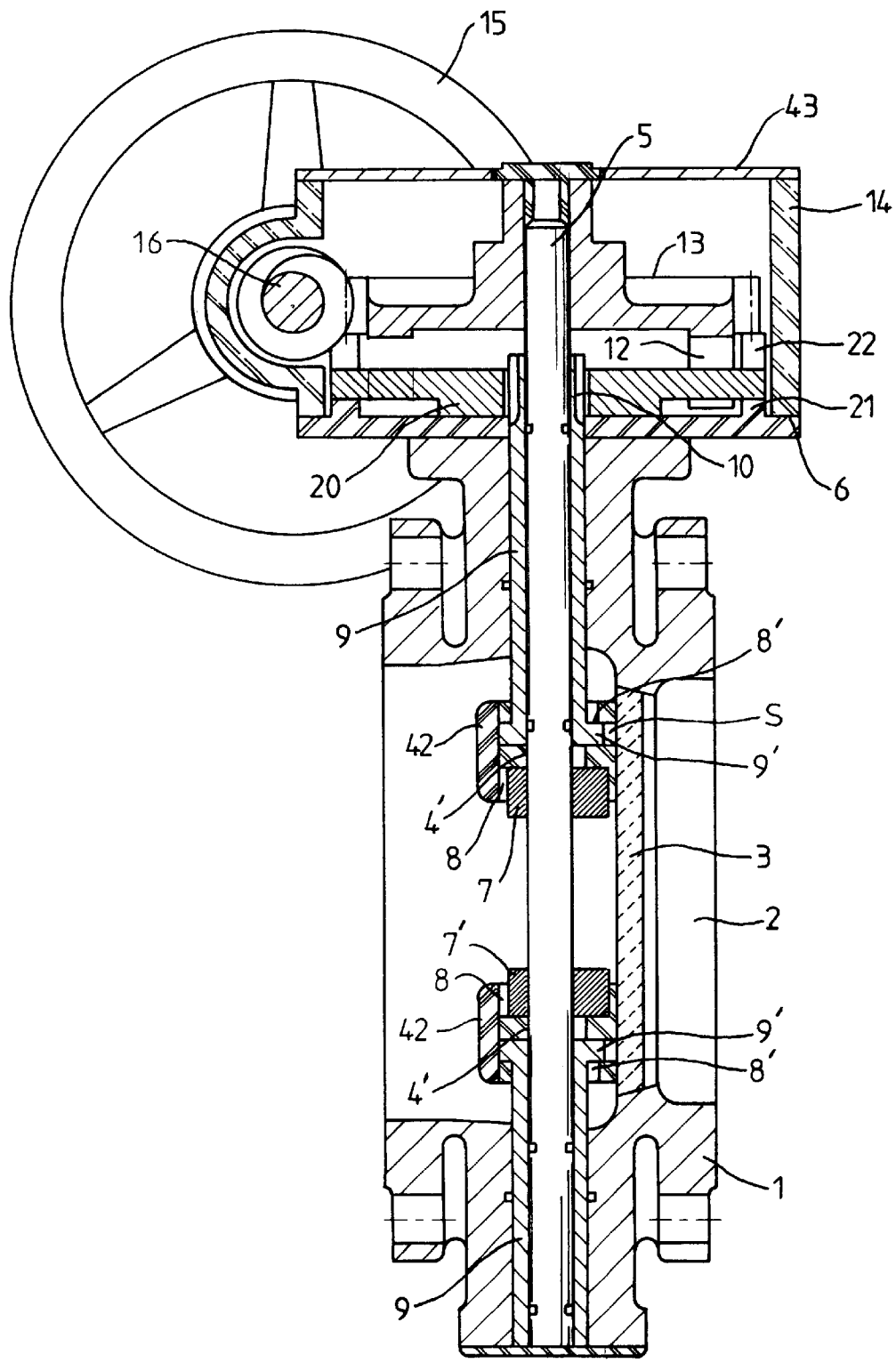
FIG. 2 is a longitudinal sectional view illustrating a valve according to a preferred embodiment of the present invention, wherein a disk is closed.
Figure 3:
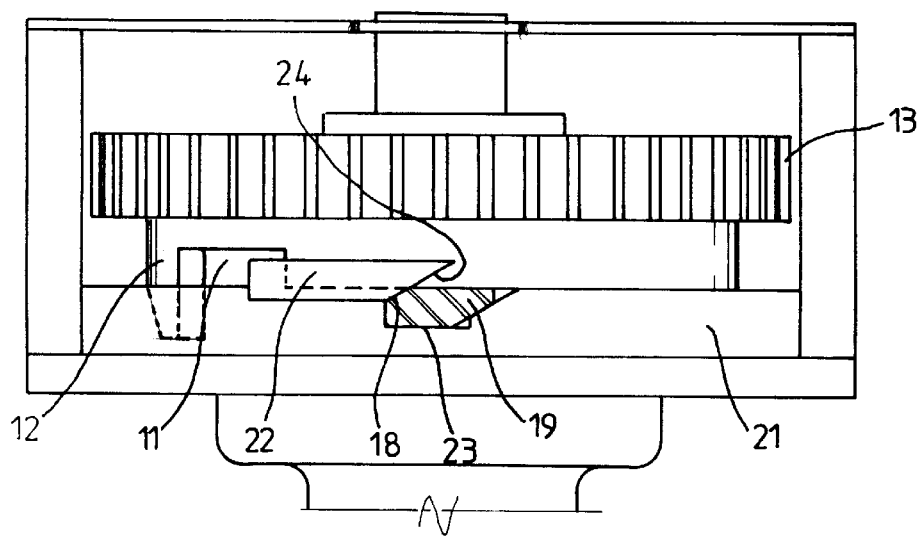
FIG. 3 is a view illustrating an operation of removing a slider of a rotating plate from an inserting groove.
Figure 4:
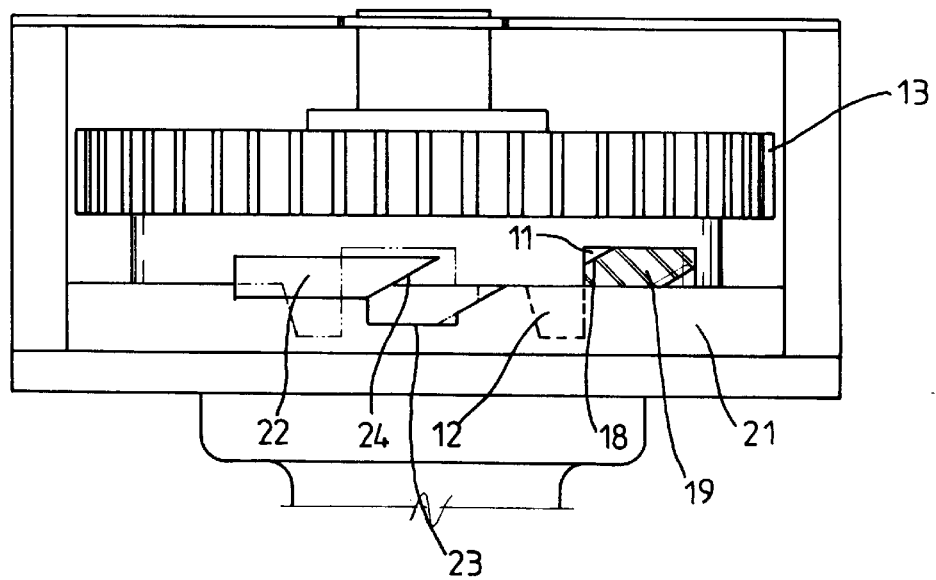
FIG. 4 is a view illustrating a slider of a rotating plate which is removed from an inserting groove.

The following is the description of the preferred embodiments according to the present invention. In the drawings, like reference numerals have been used to identify like elements in each Figure.

A butterfly valve comprises a disk 3 for opening and closing a conduit 2 of a cylindrical valve body 1. A pair of bosses 4 are fixed on upper and lower sides of the disk with a predetermined space, respectively. A depressing shaft 5 having a length longer than diameter of the valve body 1 is inserted into central holes 4' of the bosses 4 such that an upper end of the same extends out of an upper side of a flange 6 of the valve body 1. Eccentric cams 7 and 7' are positioned in inner guide grooves 8 of the bosses 4. Disk open/close shafts 9 are respectively inserted into upper and lower outer circumferences of the depressing shaft 5. Rectangular plates 9' are inserted into the outer guide grooves 8' with a gap S. The upper disk open/close shaft 9 extends toward the upper side of the flange so that it cannot cover the depressing shaft 5 and is fixed by a spline 10. A wormwheel 13 is mounted on the disk depressing shaft 5 penetrating into a cylindrical casing 14 of the flange 6. The wormwheel 13 is provided with supporting grooves 11 and projections 12 which are alternatively formed in a rotating direction, the wormwheel 13 meshing with a worm 16 having a handle 15 mounted on a side of the cylindrical casing 14. A rotating plate 20 is engaged with the spline 10 of the disk open/close shaft 9 such that sliders 19 and 19' can be inserted into the supporting grooves 11 of the wormwheel 13 to rotate along a guide rail formed on an upper surface of the flange 6. The sliders 19 and 19' are mounted on opposite sides of the rotating plate 20 and has a slope surface 18 parallel to a central gear hole 17. The sliders 19 and 19' are designed to reversely rotate by 180 degrees by drop guide projections 22 and 22' extending upward from the guide rail 21. The guide rail 21 is provided with slider inserting grooves 23 and 23' such that when the wormwheel 13 rotates in a closing direction, the sliders 19 and 19' can be inserted into the inserting grooves 23 and 23' by the slope surfaces 24 of the drop guide projections 22 and 22', thereby being separated from the wormwheel 13, and when the wormwheel 13 rotates in an opening direction, the sliders 19 and 19' are removed from the slider inserting grooves 23 and 23' by the projections 12 and fitted into the supporting grooves 11, thereby being engaged with the wormwheel 13 to rotate therewith.

According to another embodiment of the present invention, the disk open/close shaft 9 extends out of the upper surface of the flange such that it is lower than the disk depressing shaft 5. A rotating control plate 27 is integrally fixed on the upper surface of the flange 6. The rotating control plate 27 is provided with fixing grooves 25 and stoppers 26 and 26'. An open/close lever 28 and a depressing lever 29 are respectively fixed on the disk open/close shaft 9 and the disk depressing shaft 5. The open/close lever 28 is provided with a rotation preventing projection 33 supported on an arc-shaped projection 32 extending from an outer surface of a shaft supporting portion 29' of the depressing lever and a supporting member 34 supported on a supporting groove 25 of the rotating control plate 27. A projecting portion 35 extends from a base of a side wall 28'. A supporting pin 37 elastically supported by a spring 36 is inserted into the projecting portion 35, the supporting pin 37 descending and ascending by a projection 38 and a connecting portion 39 by a range of the supporting groove 25 of the rotating control plate 27. The depressing lever 29 mounted on an upper end of the disk depressing shaft 5 is provided with a projection 35' corresponding to the projection 35 of the open/close lever 28, a supporting pin groove 40 into which the supporting pin 37 is removably inserted, and a hook plate 41 supported on a side wall of the hinge portion 31' of the open/close lever 28.

The reference numerals 42, 43, and 44 which are not described indicate a cover plate of the bosses, an upper plate of the casing 14, and a disk plate functioning as the wormwheel 13, respectively.

In the present invention as described above, when the disk open/close shaft 9 is rotated, the disk 3' on which the bosses 4 are fixed is rotated as the rectangular plate 9' inserted into the outer guide groove 8' through the central hole 4' of the bosses 4 rotates the bosses 4, thereby opening the conduit 2. In addition, when the disk depressing shaft 5 inserted into the disk open/close shaft 9 is rotated, the disk rotate within the central hole 4' of the bosses 4. At this point, since the eccentric cams 7 and 7' are integrally mounted on the disk depressing shaft 5 while being mounted on the inner guide groove 8 of the bosses 4, when the disk depressing shaft 5 is rotated, the bosses 4 are displaced by the eccentric rotation of the eccentric cams 7 and 7' by the gap S formed by inserting the rectangular plate 9' of the disk open/close shaft 9 into the outer guide groove 8'. As a result, the disk 3 integrally fixed on the bosses 4 is linearly displaced in an axis direction of the conduit 2, air-tightly contacting the valve seat.

Accordingly, the structure for rotating the disk open/close shaft 9 and the disk depressing shaft 5 can be made using a gear or a lever. FIGS. 1 through 7 show a gear-type structure which will be described hereinafter.

When the worm 16 is rotated by the handle 15 attached on the worm 16, the wormwheel meshing with the worm 16 is rotated. At this point, since the sliders 19 and 19' of the rotating plate 20 engaged with the spline 10 of the upper end of the disk open/close shaft 5 are inserted into the supporting groove 11 formed on the bottom surface of the wormwheel 13, the rotating plate 20 rotates as the wormwheel 13 rotates, whereby the disk open/close shaft 9 and the disk depressing shaft 5 are simultaneously rotated. As a result, the eccentric rotation force of the eccentric cams 7 and 7' is not transmitted to the disk 3.

As described above, when the disk open/close shaft 9 and the disk depressing shaft 5 are simultaneously rotated, the disk starts to rotate through the open/close shaft and bosses 4. When intending to partially close the conduit 2 in a state where the disk 3 is completely opened, if the worm and wormwheel 16 and 13 are rotated in the closing direction by the handle, the disk open/close shaft 9 is rotated while the rotating plate 20 having the slider 19 is inserted into the supporting groove 11 of the wormwheel 13, thereby partially closing the conduit 2.

When intending to partially or completely open the conduit, the slider 19 inserted into the supporting groove 11 of the wormwheel 13 rotates in the opening direction while sliding along the upper surface of the guide rail 21, thereby opening the disk 3. When intending to completely close the conduit 2, if the handle is completely rotated in the closing direction, the slider 19 of the rotating plate 20 inserted into the supporting groove 11 of the wormwheel 13 rotates with the wormwheel 13 while sliding along the guide rail 21 of the flange 6, thereby rotating the disk open/close shaft 9 through the spline 10 engaged with the slider 19 to close the conduit 2. When the conduit 2 is completely closed by the rotation of the disk 3, the slider 19 is hooked on the drop guide projection 22 opposing the upper surface of the guide rail 21 and, at the same time, the slope surface 18 slides down into the slider inserting groove 23 along the slope 24 of the drop guide projection 22. As a result, the slider 19 is removed from the supporting groove 11 of the wormwheel 13 to limit the rotation of the rotating plate 20. That is, since only the wormwheel 13 is rotated, the rotation of the disk open/close shaft 9 is stopped in a state where the conduit 2 is closed, while the disk depressing shaft 5 mounted on the wormwheel 13 is rotated, whereby as described above, by the eccentric rotation of the eccentric cam 7 mounted on the disk depressing shaft, the bosses 4 are displaced in the axis direction by the gap S while the disk 3 tightly contacts the valve disk to air-tightly close the conduit.

Accordingly, when opening the disk 3, if the handle is reversely rotated, the wormwheel 13 rotates until the projection 12 of the wormwheel 13 which has been more rotated than that of the rotating plate 20 which slides down on the slider inserting groove 23, contacts the slider 19 of the rotating plate 20, and slightly rotates the disk depressing shaft 5, thereby slightly releasing the disk 3 from the valve seat. After this, when the wormwheel 13 is further rotated such that the projection 12 contacts the slider 19 of the rotating plate 20, the projection 12 removes the rotating plate 20 from the slider inserting groove 23 so as to reposition the rotating plate 20 on the upper surface of the guide rail 21 while inserting the same within the inserting groove 11, whereby the rotating plate 20 and the wormwheel 13 start to simultaneously rotate. As a result, the disk depressing shaft 5 and the disk open/close shaft 9 are rotated together, thereby opening the disk. At this point, when the slider 19 contacts a rear end of the drop guide projection 22, the disk 3 is completely opened to open the conduit 2.

Figure 5:
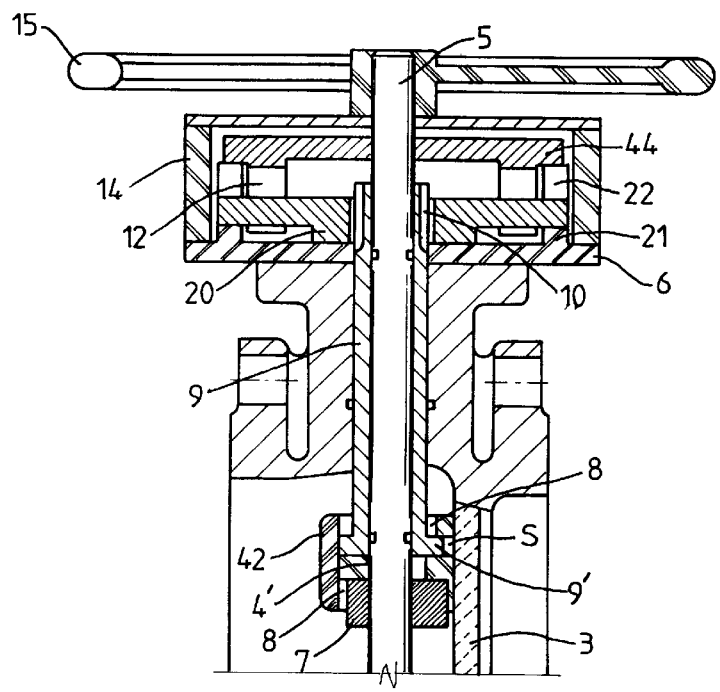
FIG. 5 is a sectional view of a valve according to another embodiment of the present invention, wherein a location of a handle is displaced.
Figure 6:
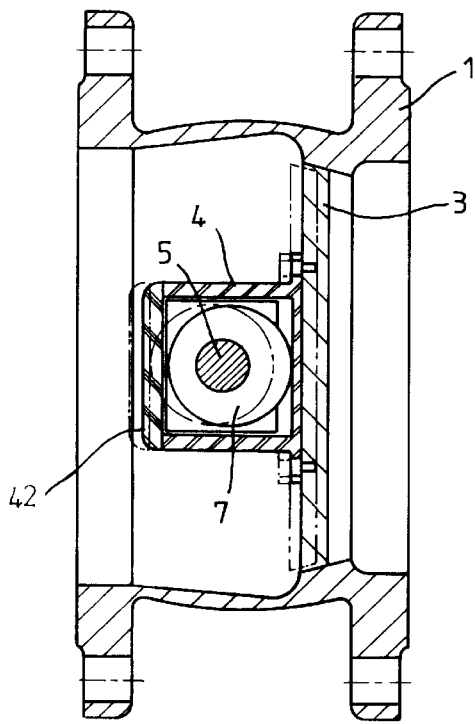
FIG. 6 is a sectional view illustrating a depressed state of a disk.
Figure 7:
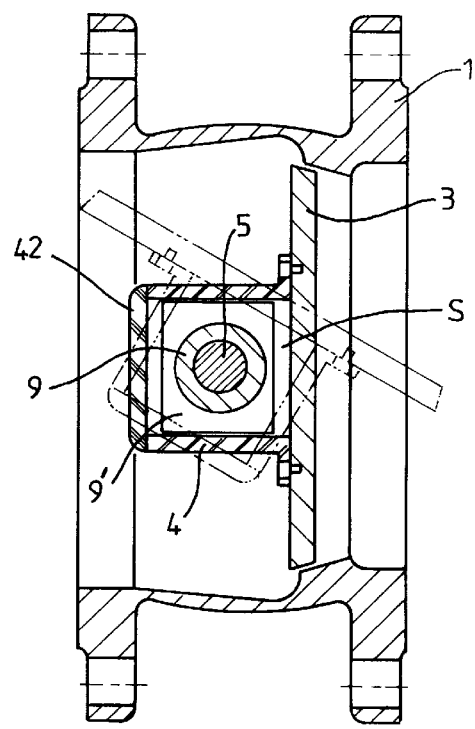
FIG. 7 is a sectional view illustrating an opened state of the disk.
Figure 8:
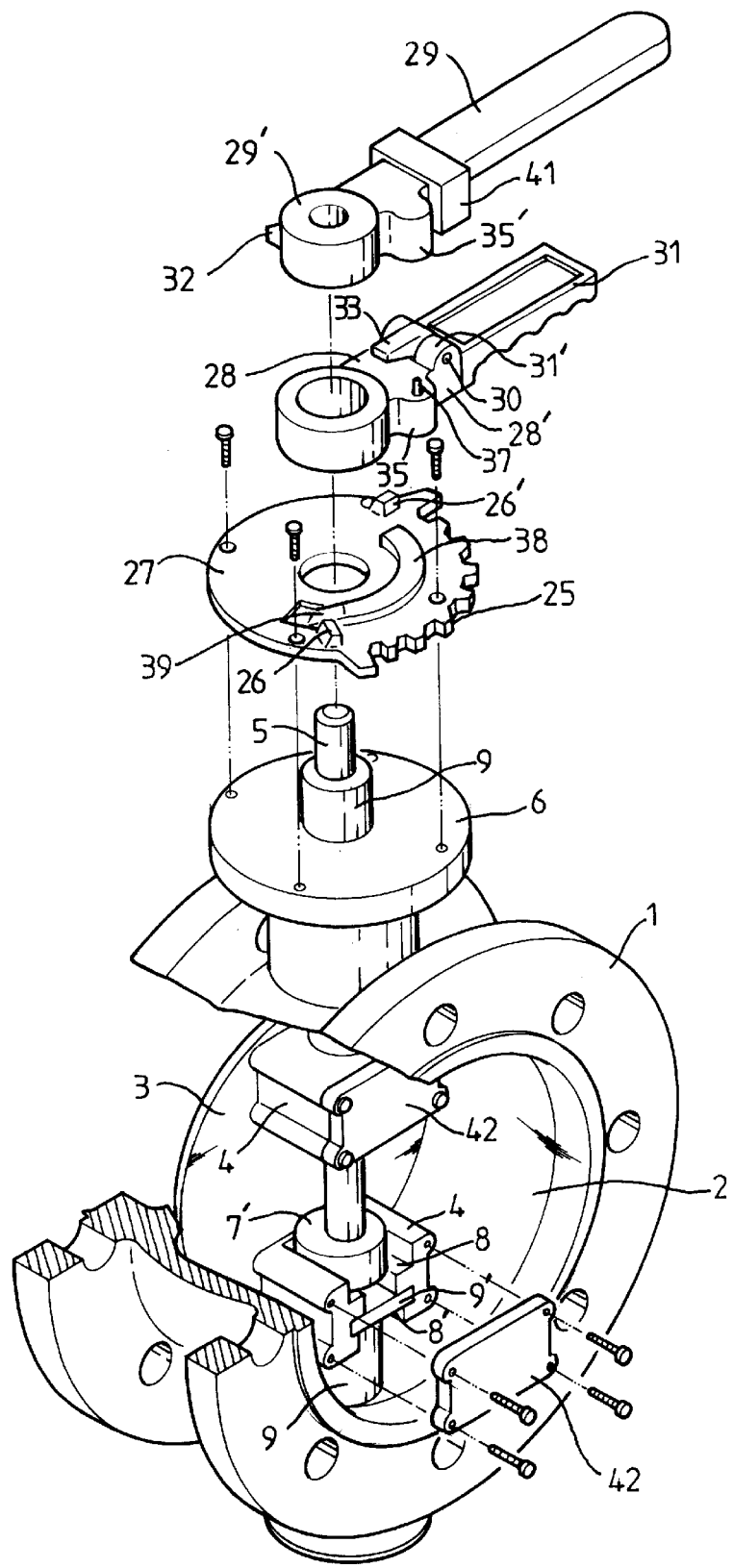
FIG. 8 is a view of an open/close structure of a disk according to another embodiment of the present invention.
Figure 9:
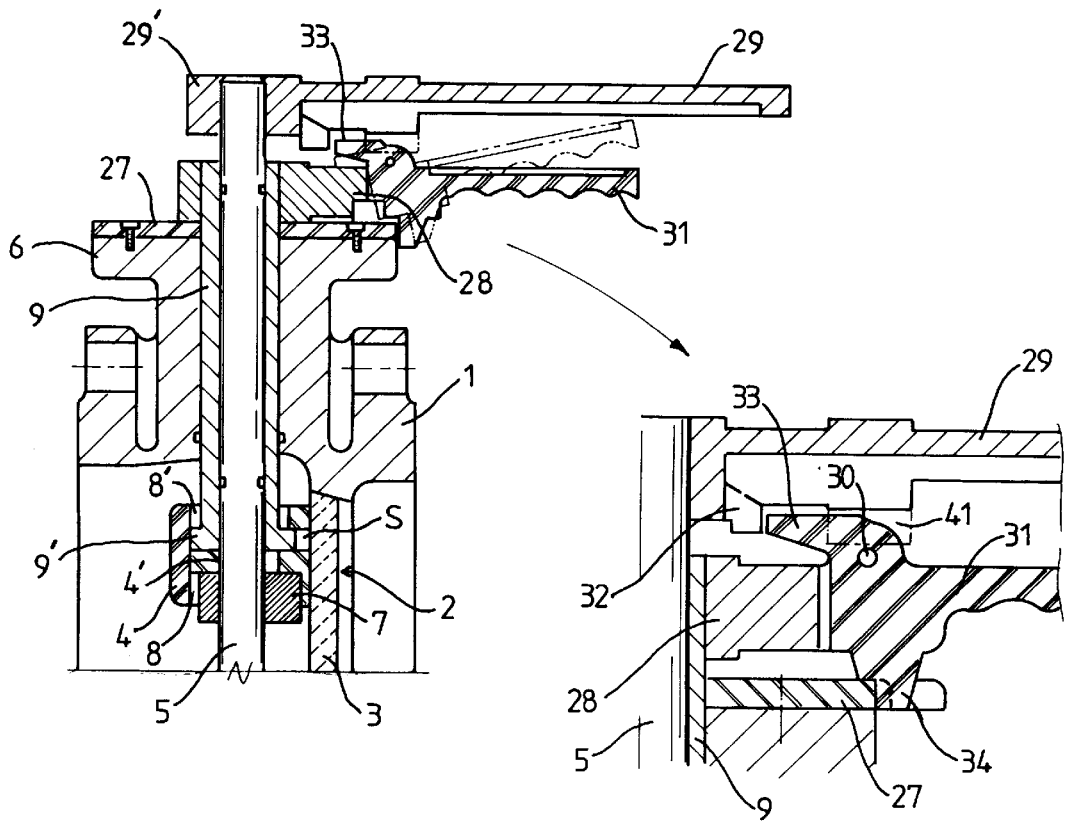
FIG. 9 is an enlarged sectional view illustrating a lever.

According to another embodiment of the present invention, as shown in FIG. 5, if a disk member 44 instead of the wormwheel and worm is mounted on the disk depressing shaft 5, and the handle 15 is directly connected to the upper end of the disk depressing shaft 5, the same effect as the above described embodiment can be obtained.

The structure for rotating the disk open/close shaft 9 and the disk depressing shaft 5 according to another embodiment of the present invention can be made using a lever. FIGS. 8 through 13 show a lever-type structure which will be described hereinafter.

Open/close and depressing levers 28 and 29 are integrally fixed on the disk open/close shaft 9 and the disk depressing shaft 5, respectively. A supporting pin 37 biased downward by a spring 36 within the side projection portion 35 of the open/close lever 28 extends upward by the projection 38 of the rotating control plate 27 such that the pin 37 is inserted into the supporting pin hole 40 of the depressing lever 29. By this structure, the open/close lever 28 and the depressing lever 29 are designed to simultaneously rotate from the open state to the closed state. When partially closing the conduit 2 in a state where the disk 3 is completely opened, if the handle 31 of the open/close lever 28 is slightly lifted, the handle 31 is rotated about the hinge portion 31' and, at the same time, the supporting member 34 extending from the hinge portion 31' is lifted such that it can be removed from the supporting groove 25 of the rotating control plate 27. At this state, when the open/close lever 28 is rotated by the handle, as described above, by the operation of the rectangular plate 9' inserted into the outer guide groove 8' of the bosses 4, the disk open/close shaft 9 and the disk pressure plate 5 connected to the disk open/close shaft 9 by the supporting pin 37 are simultaneously rotated, whereby the conduit is closed by the disk 3. After this, when the handle 31 of the open/close lever 28 is positioned to its initial position, since the supporting member 34 is supported within the supporting groove 25 of the rotating control plate 27, the open/close lever 28 cannot move any more, fixing the disk 3.

In addition, when intending to completely close the conduit 2, as described above, after removing the supporting member 34 from the supporting groove 25 of the rotating control plate 27 by lifting the handle 31 of the open/close lever 28, if the open/close lever 28 is rotated in the closing direction, the depressing lever 29 integrally connected to the open/close lever 28 by the supporting pin 37 is simultaneously rotated such that the side wall 28' of the open/close lever 28 reaches the stopper 26. When the side wall 28' reaches the stopper 26, the open/close lever 28 cannot rotate any more and, at the same time, the supporting pin 37 is removed from the projection 38 of the rotating control plate 27 and reaches the connecting portion 39. At this point, the supporting pin 37 is forced downward by the spring 36 and removed from the supporting pin hole 40 of the depressing lever 29, whereby the open/close lever 28 is separated from the depressing lever 29 and the rotation of the disk open/close shaft 9 is completed so that the disk 3 completely closes the conduit 2.

As described above, when the open/close lever 28 is rotated until and stopped by the stopper 26, since the open/close lever 28 cannot rotate any more, the disk depressing shaft 5 is rotated as the separated depressing lever 29 is rotated in the closing direction. At this point, the eccentric cams 7 and 7' mounted on the disk depressing shaft 5 are eccentrically rotated to displace the bosses 4 by the gap S, thereby depressing the disk 3 on the valve seat to provide air-tight seal.

In addition, when opening the conduit, the depressing lever 29 which is more rotated than the open/close lever 28 is rotated in the opening direction to meet with the open/close lever 28. At this point, the disk depressing shaft 5 on which the depressing lever 29 is mounted is rotated to retrieve the bosses 4 by the eccentric rotation of the eccentric cams 7 and 7', thereby releasing the depressing force of the disk 3 applied to the valve seat. In addition, since the hook plate 41 is supported on the side wall of the hinge portion 31' of the open/close lever 28, if the supporting member 34 is removed from the supporting groove 25 of the rotating control plate 27 and rotated by lifting the handle 31 of the open/close lever 28, the supporting pin 37 of the open/close lever 28 ascends from the connecting portion 39 of the rotating control plate 27 to the projection 38 to be inserted into the supporting pin hole 40, thereby the open/close lever 28 and the depressing lever 29 are simultaneously rotated to open the conduit 2.

Figure 10:
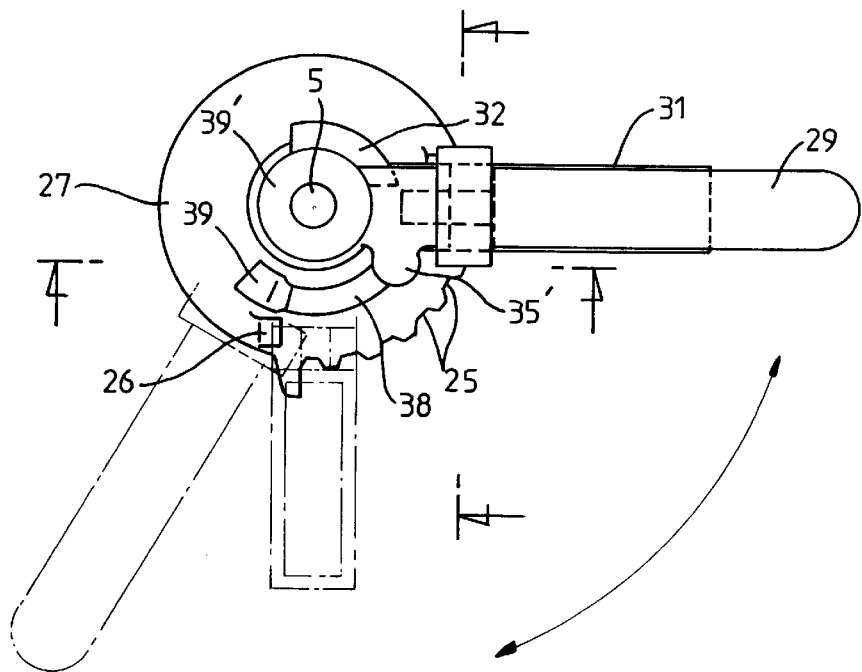
FIG. 10 is a plan view illustrating a location of the lever when the disk is opened.
Figure 11:
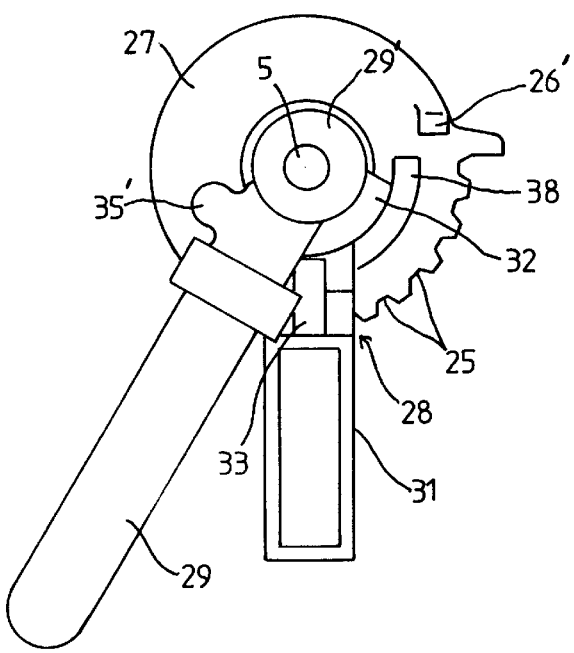
FIG. 11 is a plan view illustrating a location of a lever when the disk is closed.
Figure 12:
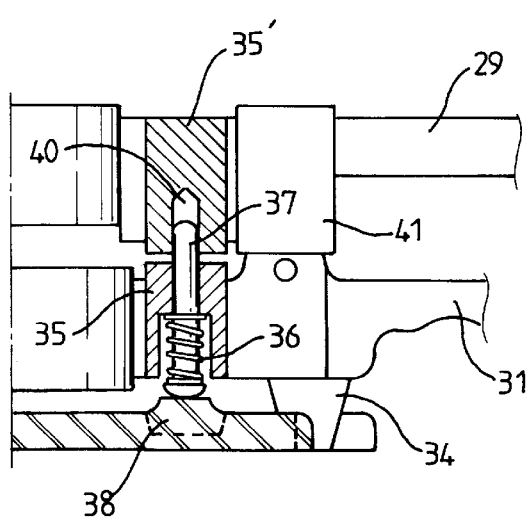
FIG. 12 is a sectional view taken along a line A—A of FIG. 10.
Figure 13:
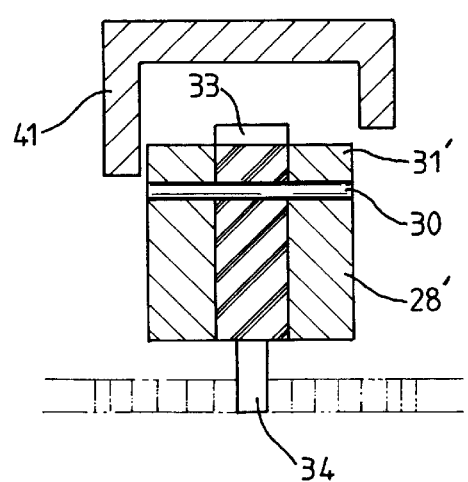
FIG. 13 is a sectional view taken along a line B—B of FIG. 10.

Here, when opening the conduit in a state where the depressing lever 29 is more rotated than the open/close lever 28 and the conduit 2 is completely closed as shown in FIG. 10, if the handle 31 is lifted to rotate the open/close lever 28 without conforming the depressing lever 29 with the open/close lever 28 by first rotating the depressing lever, the rotation preventing projection 33 cannot be pivoted upward by being hooked on the arc-shaped projection 32 extending from an outer surface of the shaft supporting portion 29' of the depressing lever 29 and open/close lever 28 and the rotation preventing projection 33 extending from the hinge portion 31'. However, if the depressing lever 29 is first rotated to conform with the open/close lever 28, since the arc-shaped projection 32 is simultaneously rotated and not positioned on a front side of the rotation preventing projection 33 of the open/close lever 28, the handle 31 of the open/close lever 28 can be lifted so as to prevent the open/close lever 28 from being first rotated, thereby preventing the malfunction.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A butterfly valve comprising a disk for opening and closing a conduit of a cylindrical valve body, a pair of bosses, fixed on upper and lower sides of the disk, a depressing shaft having a length longer than a diameter of the valve body and inserted into central holes of the bosses such that an upper end of the shaft extends out of an upper side of a flange of the valve body, two eccentric cams positioned in inner guide grooves of the bosses, two disk open/close shafts respectively inserted into upper and lower outer circumferences of the depressing shaft, rectangular plates inserted into the outer guide grooves with a gap between the plates and the disk, the upper disk open/close shaft extending toward the upper side of the flange so that it cannot cover the depressing shaft and being fixed by a spline, a wormwheel mounted on the disk depressing shaft penetrating into a cylindrical casing of the flange, the wormwheel being provided with supporting grooves and projections which are alternatively formed in a rotating direction, and meshing with a worm gear driven by a handle mounted on a side of the cylindrical casing, and a rotating plate engaged with the spline of the disk open/close shaft such that sliders can be inserted into the supporting grooves of the wormwheel to rotate along a guide rail formed on an upper surface of the flange, the sliders being mounted on opposite sides of the rotating plate and each, having a slope surface parallel to a central gear hole, as well as being designed to reversely rotate 180 degrees by a drop guide projection extending upward to the guide rail, the guide rail being provided with slider inserting holes such that when the wormwheel rotates in a closing direction, the sliders are inserted into the inserting holes by the slope surfaces of the drop guide projections thereby being separated from the wormwheel, and when the wormwheel rotates in an opening direction, the sliders are removed from the slider inserting grooves by the projections and fitted into the supporting grooves, thereby being engaged with the wormwheel to rotate therewith.

2. A butterfly valve according to claim 1, wherein the disk open/close shaft extends out of the upper surface of the flange such that it is lower than the disk depressing shaft, a rotating control plate being integrally fixed on the upper surface of the flange, the rotating control plate being provided with fixing grooves and stoppers, an open/close lever and a depressing lever being respectively fixed on the disk open/close shaft and the disk depressing shaft, the open/close lever being provided with a rotation preventing projection supported on an arc-shaped projection extending from an outer surface of a shaft supporting portion of the depressing lever and a supporting member supported on a supporting groove of the rotating control plate, a projecting portion extending from a base of a side wall, a supporting pin descending and ascending by an arc-shaped projection and a connecting portion by a range of the supporting groove of the rotating control plate, and the depressing lever being mounted on an upper end of the disk depressing shaft being provided with a projection corresponding to the projection of the open/close lever and a supporting pin groove into which the supporting pin is removably inserted, and a hook plate supported on a side wall of the hinge portion of the open/close lever.

* * * * *